United States Patent [19]
Pegler et al.

[11] 3,847,555
[45] Nov. 12, 1974

[54] MILLING CUTTERS

[75] Inventors: John Owen Michael Pegler, Solihull; Brian Edward George Mapes, both of Tenbury Wells, England

[73] Assignee: Richard Lloyd Limited, Birmingham, England

[22] Filed: May 25, 1972

[21] Appl. No.: 256,857

[30] Foreign Application Priority Data
June 3, 1971  Great Britain .................... 18708/71

[52] U.S. Cl. .................. 29/105 R, 29/96, 29/105 A
[51] Int. Cl. .............................................. B26d 1/12
[58] Field of Search ................ 29/105 R, 105 A, 96

[56] References Cited
UNITED STATES PATENTS

| | | | |
|---|---|---|---|
| 2,186,423 | 1/1940 | Miller | 29/105 A |
| 2,966,968 | 1/1961 | Skeel | 29/105 X |
| 3,058,198 | 10/1962 | Williams | 29/96 |
| 3,069,937 | 12/1962 | Williams | 29/105 X |
| 3,242,553 | 3/1966 | Bogsten | 29/105 R |
| 3,410,160 | 11/1968 | LeBarre | 408/153 |
| 3,434,190 | 3/1969 | Kaiser | 29/105 X |

*Primary Examiner*—Leonidas Vlachos
*Attorney, Agent, or Firm*—Markva & Smith

[57]  ABSTRACT

Milling cutters having replaceable cutting inserts secured upon a cutter body by means of shoes and clamping members. Screw actuated wedge adjusters provide for final alignment adjustments of the inserts with the clamping members in a locked-up condition.

15 Claims, 2 Drawing Figures

MILLING CUTTERS

BACKGROUND OF THE INVENTION

This invention concerns milling cutters of the kind having replaceable cutting inserts secured upon a body of the cutter by means of shoes and clamping members.

In such milling cutters, it is known to provide means, such as an eccentric or screw, to permit adjustment of the position of the insert in the shoe prior to the insert being locked in position. It is also known to provide such an eccentric or screw to permit adjustment of the position of the shoe prior to the shoe and insert being locked in position.

Such means for permitting adjustment often suffer from disadvantages in that an eccentric can yield at its pivoted mounting. Also, a screw can yield even when subject to axial loads. In each case the insert is permitted to move by a few thousandths of an inch when under load. This can be important where great accuracy of finish is required. Furthermore, it is necessary to exercise great care when locking the insert and shoe in position to avoid upsetting the initial adjusted setting of the position of the insert.

PURPOSE OF THE INVENTION

An object of the invention is to provide an improved form of milling cutter whereby these disadvantages may be minimized.

SUMMARY OF THE INVENTION

According to the present invention therefore a milling cutter comprises a body, at least one shoe clampingly securable in said body, a clamp member to locate a cutting insert in said shoe and adjustment means for adjusting the position of said shoe relative to the body. The adjustment means comprises a wedge member which has a screw acting thereon. The wedge member is so disposed between the body and the shoe that the screw may be rotated to move the wedge longitudinally with respect to the screw axis to thereby move the shoe generally transversely to the axis of the screw.

The prior art eccentrics and screws are subjected to shear loads at their mountings and threads when the tool is in use. However, the wedge member of the present adjustment means in preferred forms of the invention is not subject to shear loads and, being disposed between the shoe and the body, the working loads are applied by the shoe as crush or compression loads on the wedge member which transmits them direct to the body.

To obtain best utilization of the milling cutter of the invention, a method of setting up the milling cutter is provided. The method comprises the steps of locating the cutting insert in position in the shoe and locating the shoe generally in position on the cutter body. The clamp member and means for securing the shoe are tightened to secure them in position and, after such tightening, the adjusting screw is turned to cause the wedge to force the clamp member and means for securing the shoe to yield slightly to permit the cutting insert to be advanced by up to a few thousandths of an inch to a desired position.

Thus, the structural nature of the milling cutter of the invention permits the cutting insert to be positioned with great accuracy and security through the method of setting up in accordance with the invention.

The wedge member is preferably a close fit in a complementary shaped recess in the body, and preferably acts on an inner planar end face of the shoe.

To minimize any reactive loads on the screw the wedge angle is preferably less than the angle of repose of steel on steel.

BRIEF DESCRIPTION OF DRAWINGS

The invention will be described further, by way of example, with reference to the accompanying drawings, wherein.

DESCRIPTION OF SPECIFIC EMBODIMENTS

Figure 1:
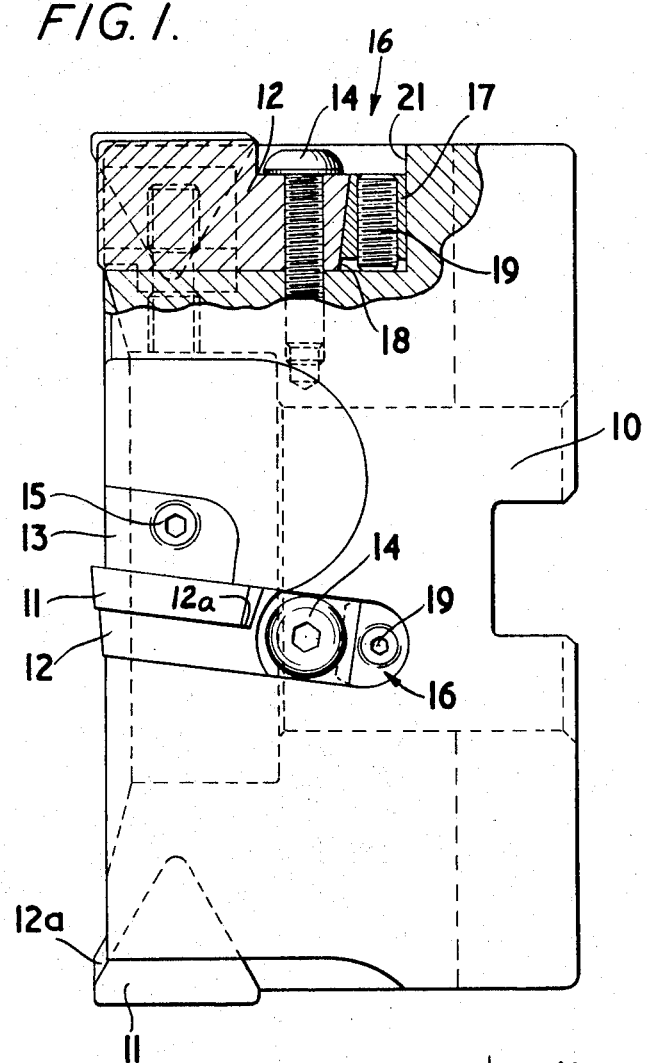
FIG. 1 shows, in part sectional side elevation, a milling cutter of the invention.
Figure 2:
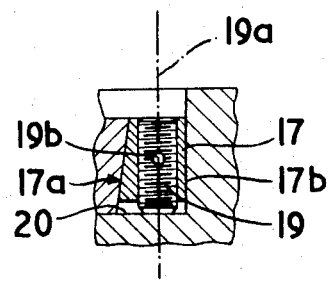
FIG. 2 shows a detail of FIG. 1.

The milling cutter comprises a body 10, a series of cutting inserts 11, each mounted upon a respective shoe 12 and located thereon by respective clamp members 13. The shoes 12 are held in position by fastening means such as screws or bolts 14, and the clamp members 13 are held by bolts 15. Said screws and bolts 14 and 15 extend into sockets provided in the body 10, and the arrangement thereof is such that the screws or bolts 14 and 15 are not exposed unduly to damage when the tool is in use. The inserts 11 each abut a supporting face 12a provided by the shoe, which face 12a preferably lies in the median plane of the shoe.

Each shoe 12 has a respective adjustment means indicated generally by reference numeral 16.

Each adjustment means 16 comprises a wedge member 17 which is of partially cylindrical form, having a partially cylindrical peripheral face 17b interrupted by an inclined planar wedge face 17a. The wedge face 17a abuts and confronts a planar inner end face 18 of the shoe 12. The wedge member 17 has a longitudinal threaded bore in which a screw 19 is received, the screw 19 extending to abut the floor 20 of a recess not numbered provided in the body 10. The wedge face 17a is inclined at a small angle, namely the wedge angle, with respect to the general longitudinal axis of the wedge member 17. The axis 19a of the screw 19 is parallel to said general longitudinal axis and in this embodiment, lies in the median plane of the shoe 12. The recess has an arcuate end face 21 which is complementary to the longitudinal peripheral part cylindrical face 17b of the wedge member.

In use, when setting up the tool, the inserts 11 and shoes 12 are generally located in position and the screws or bolts 14 and 15 are tightened to lock these parts in their general positions. For some purposes, the tool could be used in this condition.

However, the accuracy may be greatly improved by placing the tool end-on on a surface plate and, using a micrometer gauge to ascertain the positions of the cutting edges of the cutting inserts 11, each screw 19 is turned either clockwise or counterclockwise in turn until all the cutting edges are brought into accurate alignment.

The skilled reader will already appreciate that bolts and screws such as 14 and 15 can yield slightly when subject to transverse loads, and in fact this can cause problems, in use, with some known tools. However, the adjustment means 16 as described takes advantage of this face by (1) providing the wedge face with only a small wedge angle, (2) providing the screw 19 with a fine pitch thread, and (3) arranging the wedge member 17 to be in crush or compressed between the body 10 and the shoe 12 to obtain a great mechanical advantage and thrust upon the shoe 12 transversely to the axis of the screw 19. Consequently, the bolts 14 and 15 are forced to yield while tightened down to permit the insert 11 to be moved by up to a few thousandths of an inch as necessary to align said insert 11 with precision.

Furthermore, since the wedge angle in this embodiment is less than about 12°, e.g. lying in the range of 5° to 10° and preferably having a value of 8°, working loads are, in general, transmitted by way of the shoe 12 and the wedge member 17 from the insert 11 to the body 10. This obviates or minimizes any tendency for the bolts or screws 14, 15 and 19 to yield or move due to working loads. Thus the insert 11 is most securely located.

As is evident herein, the adjustment means 16 is used for adjusting the position of the shoe 12 along a direction of movement with respect to the body 10 to vary the extent of projection of the cutting insert 11 from the body 10. The wedge member 17 has an inclined surface and is disposed between opposing faces located on the body 10 and the shoe 12. The wedge member 17 is movable along an axis that is transverse to the direction of movement for the shoe 12. The inclined surface of the wedge member 17 is operatively associated with one of the opposing faces so that as the wedge member 17 is moved along its axis of movement, the shoe 12 is moved along the direction of movement for the shoe 12. In a more specific embodiment, the wedge member 17 has an inclined face and a bore extending in a direction transverse to the direction of adjustable movement for movement in the direction of the bore axis. Moving means comprising a screw 19 in this embodiment is disposed in the bore to effect movement of the wedge 17 along the bore axis.

The invention is not confined to the precise details of the foregoing example, as, for instance, the screw 19 could have an anti-vibration holding insert 19b of plastics material.

The shape of the wedge member 17 may be varied as may be its orientation in the body 10 within the limits necessary for obtaining the described effects, and said member 17 may act on a shoulder of the shoe.

Also, it will be appreciated that the inserts 11 can be of any suitable shape, can be mounted in any suitable body, and can be presented to the workpiece at any required angle.

We claim:
1. A milling cutter comprising:
 a. a body,
 b. at least one shoe adjustably secured to said body with a first screw means passing through the shoe into said body,
 c. a cutting insert located in said shoe, and
 d. adjustment means for adjusting the position of the shoe along a direction of movement with respect to the body to vary the extent of projection of the cutting insert from the body,
 e. said adjustment means including a wedge member and rotatably mounted second screw means,
 f. said wedge member being disposed between opposing surfaces located on said body and said shoe,
 g. said second screw means being adapted to move the wedge member longitudinally of the screw means when the screw means is rotated whereby the shoe and insert located on the shoe are moved transversely of the second screw means by wedge action against the securing action of the first screw means.

2. A milling cutter as defined in claim 1 wherein the wedge member has a wedge face inclined at an angle of less than about 12° to the general longitudinal axis of the wedge member.

3. A milling cutter as defined in claim 1 wherein the wedge member has a wedge face disposed an an inclined angle within the range of about 5° to about 10°.

4. A milling cutter as defined in claim 1 wherein said wedge member includes a threaded bore and the axis of the second screw means is parallel to the general longitudinal axis of movement for the wedge member,
 said second screw means being disposed within said threaded bore in a manner effective to place the screw means under compression.

5. A milling cutter as defined in claim 4 wherein the axis of the screw lies in the median plane of the shoe.

6. A milling cutter as defined in claim 5 wherein said cutting insert abuts a supporting face of said shoe and
 said supporting face lies in said median plane.

7. A milling cutter as defined in claim 1 wherein the second screw means has a fine pitch and includes an anti-vibration holding insert composed of plastic material.

8. A milling cutter as defined in claim 1 wherein said opposing surfaces are inclined in a direction effective to retain the wedge member between the shoe and the body when not causing a wedging force to be applied to the shoe.

9. In a milling cutter having a body, at least one shoe adjustably secured to said body with screw holding means, a cutting insert located in said shoe, and adjustment means for adjusting the position of said shoe along a direction of movement with respect to the body to vary the extent of projection for the cutting insert from the body, said adjustment means comprising:
 a. a wedge member having an inclined surface
 b. said wedge member being disposed between opposing faces located on said body and said shoe of the milling cutter,
 c. said wedge member being movable along an axis that is transverse to the direction of movement for the shoe, and
 d. means for effecting movement of the wedge member in said transverse direction,
 e. said inclined surface of the wedge member being operatively associated with one of the opposing faces so that as the wedge member is moved along its axis of movement, the shoe is moved along said direction of movement for the shoe,
 f. said screw holding means includes first clamping means adjustably securing the shoe to the body with a screw means that passes through the shoe into the body and second clamping means holding the cutting insert in said shoe, g. said wedge action of the wedge member being effected against the clamping forces of said first and second clamping means.

10. Adjustment means as defined in claim 9 wherein the wedge member is contiguous to the surfaces formed in a shaped recess within the body, said recess being formed between said opposing faces.

11. Adjustment means as defined in claim 9 wherein one of the opposing faces is inclined and is contiguous to the inclined surface of the wedge member.

12. Adjustment means as defined in claim 11 wherein said inclined opposing face is disposed on the shoe.

13. Adjustment means as defined in claim 9 wherein said wedge member has a partially cylindrical form and includes an inclined face which interrupts a portion of the peripheral surface of the wedge member.

14. Adjustment means as defined in claim 9 wherein said wedge member includes a threaded bore and said movement effecting means includes a screw means accommodated in said threaded bore and having a length effective for the end of the screw means to abut against said body.

15. A method of setting up a milling cutter wherein the milling cutter has a body, at least one shoe adjustably secured to the body, a cutting insert located in the shoe, adjustment means for adjusting the position of the shoe along a direction of movement with respect to the body to vary the extent of projection for the cutting insert from the body, first clamping means adjustably securing the shoe to the body and second clamping means holding the cutting insert in said shoe, and wherein said adjustment means comprises a wedge member disposed between the body and the shoe, and a screw acting on the wedge member, said method comprising the steps of:
  a. locating the cutting insert in position on the shoe,
  b. locating the shoe generally in position on the body,
  c. tightening the first clamping means for securing the shoe in position on the body,
  d. tightening the second clamping means for holding the cutting insert on the shoe, and then
  e. turning the screw to cause the wedge to act directly on the shoe to force the first and second clamping means to yield slightly thereby permitting the cutting insert to be advanced in a forward direction by up to a few thousandths of an inch to the desired set-up position.

* * * * *